United States Patent [19]

Miller et al.

[11]  4,272,425
[45]  Jun. 9, 1981

[54] TREATING DISPERSIONS OF ACRYLONITRILE POLYMERS

[75] Inventors: James R. Miller, Richfield; Edward J. Leeson, Avon Lake, both of Ohio

[73] Assignee: The B. F. Goodrich Company, Akron, Ohio

[21] Appl. No.: 88,439

[22] Filed: Oct. 26, 1979

[51] Int. Cl.³ .................... C08F 6/16; C08F 236/12
[52] U.S. Cl. ..................... 260/29.7 PT; 525/315; 526/93; 528/485; 528/487; 528/492; 528/498
[58] Field of Search ............ 260/29.6 AN, 29.6 CM, 260/29.6 PT, 29.7 T, 29.7 AT, 29.7 PT, 485; 528/492, 498

[56] References Cited

U.S. PATENT DOCUMENTS

| | | | |
|---|---|---|---|
| 2,662,867 | 12/1953 | Hoertz | 260/29.6 F |
| 2,713,568 | 7/1955 | Fisher, Jr. | 260/29.6 PT |
| 3,692,726 | 9/1972 | Oehmichen | 260/29.6 R |
| 3,832,317 | 8/1974 | Mikofalvy | 260/29.6 RB |
| 3,991,136 | 11/1976 | Dalton | 525/243 |

*Primary Examiner*—C. A. Henderson
*Attorney, Agent, or Firm*—J. Hughes Powell, Jr.

[57] ABSTRACT

Residual acrylonitrile dissolved in acrylonitrile copolymers and/or water in which acrylonitrile polymers are polymerized or processed such as a latex thereof or from acrylonitrile processes can be substantially reduced by adding to polymer-water mixtures for example, after at least 90% of the monomers have been polymerized, additional catalyst and an amount of comonomer in excess of the amount of free acrylonitrile present.

5 Claims, No Drawings

TREATING DISPERSIONS OF ACRYLONITRILE POLYMERS

BACKGROUND OF THE INVENTION

Acrylonitrile is the basis for a family of important commercial polymers. For example, copolymers of butadiene with less than 50% acrylonitrile provide oil resistant polymers. Copolymers of alkyl acrylates with acrylonitrile provide a range of polymer products. For example when ethyl acrylate is the major component, oil resistant elastomers are obtained; and when acrylonitrile is the predominant comonomer, useful molded plastic materials are obtained. Copolymers of a major proportion of styrene and minor proportions of acrylonitrile are also useful in modifying vinyl chloride polymers, as moldable plastics and as components of ABS resin blends. Normally these acrylonitrile containing polymers are prepared by polymerization in water. Even when such polymerizations are substantially complete, there still remains undesirable amounts of unpolymerized acrylonitrile dissolved both in the polymer and the water. Normal procedures of stripping by vacuum or steam does not normally remove all of this undesirable acrylonitrile.

SUMMARY OF THE INVENTION

Residual acrylonitrile dissolved in acrylonitrile copolymers and/or water in which acrylonitrile polymers are polymerized or processed such as a latex thereof or from acrylonitrile processes can be substantially reduced by adding to polymer-water mixtures for example, after at least 90% of the monomers have been polymerized, additional catalyst and an amount of comonomer in excess of the amount of free acrylonitrile present.

DETAILED DESCRIPTION

The aqueous suspensions or dispersions of acrylonitrile polymers used in practicing the present invention are obtained by polymerizing acrylonitrile alone, or more normally with other vinylidene comonomers to form copolymers, for example with about 50 weight percent or more of butadiene, up to about 50 weight percent acrylonitrile with about 50–95 weight percent styrene, and about 5–50 weight percent acrylonitrile with about 1–99 weight percent each of an alkyl acrylate such as methyl acrylate, ethyl acrylate, butyl acrylate, methyl methacrylate and the like; with styrene and acrylonitrile on a butadiene polymer in the well-known ABS resins, and other copolymers.

Typically, the polymerizable comonomers used in addition to butadiene, styrene and an alkyl acrylate or alkacrylate wherein the alkyl group contains 1 to 8 carbon atoms, will be vinylidene monomers having at least one terminal $CH_2=<$ group. Polymerizable comonomers useful in the present invention include: other vinyl aromatics as α-methyl styrene and chlorostyrene; α-olefins such as ethylene, propylene, and isobutylene; vinyl halides such as vinyl chloride, vinyl bromide, vinyl fluoride, vinylidene chloride, and vinylidene fluoride; vinyl esters such as vinyl acetate, other α,β-olefinically unsaturated nitriles as methacrylonitrile; alkyl vinyl ethers such as methyl vinyl ether, isopropyl vinyl ether; n-butyl ether, isopropyl vinyl ether, and haloalkyl vinyl ethers as 2-chloroethyl vinyl ether; n-octyl methacrylate, dodecyl methacrylate, methyl ethacrylate, ethyl ethacrylate, haloalkyl acrylates as chloropropyl acrylate, amino-acrylates and methacrylates and the like; vinyl ketones; vinyl pyridine, α,β-olefinically unsaturated amides such as acrylamide, N-methyl acrylamide, N-t-butyl acrylamide, N-cyclohexyl acrylamide, diacetone acrylamide; methacrylamide, and N-ethyl methacrylamide, α,β-olefinically unsaturated N-alkylol amides having the structural formula

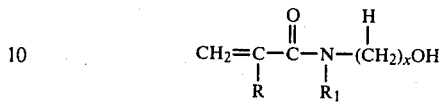

wherein R is a hydrogen or an alkyl group containing from 1 to 4 carbon atoms and x is a number from 1 to 4, $R_1$ is hydrogen or an alkyl group such as N-methylol acrylamide, N-ethylol acrylamide, N-propylol acrylamide, N-methylol methacrylamide, and N-ethylol methacrylamide; polyfunctional compounds such as methylene-bis-acrylamide, ethylene glycol dimethylacrylate, diethylene glycol diacrylate, allyl pentaerythritol and divinyl benzene; α,β-olefinically unsaturated carboxylic acid monomers containing from 3 to 10 carbon atoms such as acrylic acid, methacrylic acid, crotonic acid, β-acryloxy propionic acid, hydrosorbic acid, sorbic acid α-chlorosorbic acid, cinnamic acid, β-styrlacrylic acid, itaconic acid, citraconic acid, maleic acid, fumaric acid, mesaconic acid, glutaconic acid, aconitic acid, and the like. The preferred acid monomers are the α,β-monoolefinically unsaturated monocarboxylic acids such as acrylic acid and methacrylic acid, and the like, as are known to those skilled in the art. Mixtures of one or more of the above-mentioned monomers may be employed if desired.

Generally, butadiene or alkyl acrylate polymers will contain about 50 to 70% by weight butadiene, or alkyl acrylate wherein the alkyl group contain 1 to 8 carbon atoms, 20 to 45% of acrylonitrile and up to about 20% by weight of other polymerizable vinylidene comonomers interpolymerized.

The polymer latices may be prepared using any of the conventional polymerization techniques known to those skilled in the art, usually in an aqueous emulsion. The emulsifier may be charged at the outset of the polymerization or may be added incrementally or by proportioning throughout the run. Any of the general types of anionic, cationic or nonionic emulsifiers may be employed, however, best results are generally obtained when anionic emulsifiers are used. Typical anionic emulsifiers which may be used include those types known to those skilled in the art, for example, as disclosed beginning on page 102 in J. Van Alphen's "Rubber Chemicals", Elsevier, 1956, for example, the alkali metal or ammonium salts of the sulfates of alcohols containing from 8 to 18 carbon atoms such as, for example, sodium lauryl sulfate; alkali metal and ammonium salts of sulfonated petroleum or paraffin oils; sodium salts of aromatic sulfonic acids such as dodecane-1-sulfonic acid and octadiene-1-sulfonic acid; alkyl aryl sulfonates such as sodium isopropyl benzene sulfonate and sodium dodecyl benzene sulfonate; alkali metal and ammonium salts of sulfonated dicarboxylic acid esters such as sodium dioctyl sulfosuccinate and disodium N-octadecyl sulfosuccinamate; alkali metal or ammonium salts of the free acids of complex organic mono- and diphosphate esters; and the like. So-called nonionic emulsifiers are octyl- or nonylphenyl polyethoxyethanol and the like. Useful as emulsifiers are the alkali metal salts of the aromatic sulfonic acids and the sodium salts of the aromatic sulfonic acids and the sodium salts of the alkyl aryl sulfonates of the formula R—[Ar-SO$_3$-]$^-$M$^+$ wherein R is alkyl or alkenyl having 8 to 20 carbon atoms, Ar is aryl or phenyl or naphthyl and M is the metal ion. In addition to the above-mentioned emulsifiers it may be desirable and advantageous to add post-polymerization emulsifiers and stabilizers to the polymeric anionic latex in order to improve the latex stability if it is to be stored for prolonged periods prior to use. Such postpolymerization emulsifiers may be the same as, or different than, the emulsifier employed in conducting the polymerization but preferably are anionic or nonionic surface active agents.

To initiate the polymerization free radical catalysts are employed. The use of such catalysts, although in certain systems not absolutely essential, insure a more uniform and controllable polymerization and a satisfactory polymerization rate. Commonly used free radical initiators include the various peroxygen compounds such as the persulfates, organic peroxides, benzoyl peroxide, t-butyl hydroperoxide, cumene hydroperoxide; azo compounds such as azodiisobutyronitrile, and dimethyl azodiisobutyrate; and the like. Especially useful as polymerization initiators are the water-soluble peroxygen compounds such as hydrogen peroxide and the sodium, potassium and ammonium persulfates.

The alkali metal and ammonium persulfate catalysts may be employed by themselves or in activated redox systems. Typical redox systems include the persulfates in combination with: a reducing substance such as a polyhydroxy phenol and an oxidizable sulfur compound such as sodium sulfite or sodium bisulfite, a reducing sugar, a diazomercapto compound, a ferricyanide compound, dimethylaminopropionitrile and the like. Heavy metal ions such as silver, cupric, iron, cobalt, nickel and others may also be used to activate persulfate catalyzed polymerizations. The well known redox systems using organic peroxides as organic hydroperoxides may also be used advantageously. In general the amount of free radical initiator employed will range between about 0.1 to 5% based on the weight of the total monomers. The initiator is generally completely charged at the start of the polymerization, however, incremental addition or proportioning of the initiator throughout the polymerization is often desirable.

In conducting the polymerization for the preparation of the latices of the present invention the monomers are typically charged into the polymerization reactor which contains the water and the emulsifying agent. The reactor and its contents are then heated and the polymerization initiator added. The temperature at which the polymerization is conducted is not critical and may range from about 0° C. or lower to about 85° C. or higher. Excellent results, however, have been obtained when the polymerization temperature is maintained between 5° C. and 60° C. Polymerization modifiers such as the primary, secondary, and tertiary mercaptans, buffers, electrolytes and the like may also be included in the polymerization.

In the practice of the invention, when at least 90% of the monomers have copolymerized, more preferably after about 93–95% monomers have been copolymerized, there is added to the polymerization mixture an amount of the comonomer being polymerized with acrylonitrile in excess of the unpolymerized acrylonitrile, and additional catalyst, to induce copolymerization of said copolymer with the acrylonitrile effectively to decrease the amount of free residual acrylonitrile below 100 parts per million; more preferably below 25 parts per million. While the most effective comonomer amount that can be added may be used, there is a practical maximum amount in adding only a sufficient amount to insure reaction with substantially all of the free acrylonitrile to reduce the problem of loss or recovery of the excess comonomer. Normally an amount from about equimolar to 50 mole percent excess to the acrylonitrile will be satisfactory.

The catalyst employed is preferably one that will complete the reaction in a matter of only a few hours. The redox catalysts are well known and may be used that involve the use of a combination reducing agent and peroxy catalyst, for example, heavy metal compounds such as ferrous iron or cobalt are generally effective with organic peroxides such as capryloyl peroxide, lauroyl peroxide, cumene hydroperoxide, diisopropyl benzene hydroperoxide, and the like. Also useful in such systems are polyhydroxy ketones such as the sugars with ferrous salts and cumene hydroperoxide. Gluconates have also been found to be useful. Other effective active catalyst systems include persulfate-bisulfite systems; peroxamine; sapamine; diazothioether catalyst systems, and the like, as are well known in the art, including those set forth hereinabove. Of course any catalyst system may be used, for example even sodium persulfate, hydrogenperoxide and the like, but normally on a production basis it is desirable that equipment be tied up as short a period as possible for this step, so that the more active catalysts are employed to obtain faster reaction rates and equipment turn around. Other known catalysts such as potassium persulsulfate may be used if longer reactions are acceptable.

The acrylonitrile level may be decreased in accordance with the invention by adding the excess comonomer and catalyst in the reactor after 90% conversion has been reached, in blow-down, hold or storage tanks after removal from the polymerization reactor; or in any suitable container preferably equipped with agitation and heating means. In the selection of comonomer, it will be understood that in polymer dispersions of high conversion a different monomer may be introduced for reaction with the acrylonitrile in those situations where small amounts of another copolymer are not undesirable. For example, in the preparation of a copolymer of styrene and acrylonitrile where at the end of the polymerization there are present several thousand or more parts of unreacted acrylonitrile a redox catalyst and butadiene-1,3 or ethyl acrylate may be added to the polymerization and the acrylonitrile removed by reaction with the butadiene or acrylate and the small amount of copolymer thus formed would normally be mixed in with the copolymer of styrene and acrylonitrile in such amounts as to be not undesirable. Butadiene is a particularly useful monomer and would be used to reduced the acrylonitrile level of polymer dispersions since it reacts readily with acrylonitrile, particularly when present in an excess, and because of its low boiling point of about −4° C., it is easily and efficiently removed from the polymer dispersion without expensive or extensive processing.

As stated, any catalyst system effective in the copolymerization of acrylonitrile with other monomers at reasonable temperatures, in the range of about 5° to 95° C., more preferably about 20° to about 50° C., may be used. When butadiene is used as the reactive comonomer for decreasing the level of acrylonitrile the amount present should be in excess; for example, the butadiene level should be greater than the combining ratio or combining weight of butadiene with acrylonitrile, which is about 63 to 37. The amount of catalyst employed based on the peroxy compound, preferably is an amount at least about 0.10 part peroxy compound based on the total monomer and polymer present.

With effective redox type catalyst systems, a temperature range of about 25° to 50° C. is satisfactory to provide reaction rates of about 3 to 5 hours with a resulting amount of residual acrylonitrile obtained of less than about 100 ppm (mg/kg). In other words, reaction temperatures of about room temperature to about 60° C. which are normal polymerization temperatures for the aqueous polymerization of acrylonitrile polymers are satisfactory.

EXAMPLE

A copolymer of butadiene and acrylonitrile was prepared in water to form a latex in accordance with the recipe set forth in the Table below. With the exception of the control, additional butadiene and catalyst were added to the polymerization mixture after the monomers had reached a conversion to polymer of approximately 95%. All parts were parts by weight. The results in residual acrylonitrile after treatment were set forth in the Table. Run A was the control, with no addition of butadiene or catalyst. Run B demonstrates the ineffectiveness of catalyst alone without the comonomer. Raising the temperature of the control from the polymerization temperature of 35° C. to 72° C. for two hours did not result in any decrease in residual acrylonitrile. The temperature was also raised in Run B with no resultant decrease in acrylonitrile content after several hours at the elevated temperature. In Runs C and D a second butadiene and catalyst addition was made after the initial addition and as shown in Run F where no second addition was made, such second addition is normally not necessary.

On a production scale butadiene/acrylonitrile copolymer latex is prepared, which after conversion was essentially complete, contained about 8000 to 15000 ppm of free acrylonitrile. There was added to the latex 5 parts of water containing 0.001 phr of sodium hexahydroxyheptonate, 0.001 phr of sodium ferric ethylenediamine tetraacetic acid salt, 0.001 phr of trisodium ethylenediaminetetraacetic acid salt, 0.1 phr of sodium formaldehyde sulfoxylate, and 0.1 phr of sodium sulfite, 5 phr of butadiene-1,3 and 0.2 phr of cumene hydroperoxide (0.3 of 70% cumene hydroperoxide) at a temperature of about 35° C. After about 4 hours, the residual or free acrylonitrile had been reduced to an average of about 50 ppm.

When similar tests are conducted with latices containing for example, 20% total solids of a polymer of acrylonitrile containing unreacted acrylonitrile; an ABS latex containing free acrylonitrile; and an ethyl acrylate-acrylonitrile copolymer latex, treated respectively with additional styrene or butadiene-1,3, butadiene-1,3 or ethyl acrylate where appropriate, with a redox catalyst, the amount of free acrylonitrile is substantially reduced to less than 100 ppm.

TABLE I

|  | A | B | C | D | E | F |
|---|---|---|---|---|---|---|
| Recipe |  |  |  |  |  |  |
| NaHCO$_3$ | 0.2 | 0.2 | 0.2 | 0.2 | 0.2 | 0.2 |
| Butadiene-1,3 | 55 | 55 | 55 | 55 | 55 | 55 |
| Acrylonitrile | 45 | 45 | 45 | 45 | 45 | 45 |
| Bisisopropyl xanthogen disulfide | 1.0 | 1.0 | 1.0 | 1.0 | 1.0 | 1.0 |
| Water | 150 | 150 | 150 | 150 | 150 | 150 |
| Potassium soap of tallow acid | 5.0 | 5.0 | 5.0 | 5.0 | 5.0 | 5.0 |
| Na$_2$S$_2$O$_4$ | 0.04 | 0.04 | 0.04 | 0.04 | 0.04 | 0.04 |
| K$_2$S$_2$O$_8$ | 0.3 | 0.3 | 0.3 | 0.3 | 0.3 | 0.3 |
| Daxad 17[1] | 1.0 | 1.0 | 1.0 | 1.0 | 1.0 | 1.0 |
| Sequesterene NA3[2] | 0.03 | 0.03 | 0.03 | 0.03 | 0.03 | 0.03 |
| Sodium hexahydroxyheptonate | 0.02 | 0.02 | 0.02 | 0.02 | 0.02 | 0.02 |
| Dimethylamine | 0.02 | 0.02 | 0.02 | 0.02 | 0.02 | 0.02 |

[1] Sodium Salt of condensed naphthalene sulfonate-formaldehyde
[2] Trisodium ethylenediaminetetraacetate (Ciba-Geigy).

| Post Polymerization Addition | | | | | | |
|---|---|---|---|---|---|---|
| Butadiene-1,3 | 0 | 0 | 6.0 g | 10.0 g | 6.0 g | 11.5 |
| Sequesterene NA3[2] | 0 | 0.001 | 0.001 | 0.001 | 0.001 | 0.00 |
| Sequesterene NAFe[3] | 0 | 0.001 | 0.001 | 0.001 | 0.001 | 0.00 |
| Sodium Hexahydroxyheptonate | 0 | 0.001 | 0.001 | 0.001 | 0.001 | 0.00 |
| Na$_2$S$_2$O$_4$ | 0 | 0.15 | 0.15 | 0.15 | 0.15 | 0.15 |
| Water | 0 | 5.0 | 5.0 | 5.0 | 5.0 | 5.0 |
| Diisopropylbenzene hydroperoxide | 0 | 0.1 | 0.1 | 0.1 | 0.1 | 0.1 |

[2] Trisodium ethylenediamine tetraacetate.
[3] Ethylenediamine tetraacetic iron (Ciba-Geigy)

| Results of Post Polymerization Additions | | | | | | |
|---|---|---|---|---|---|---|
| First addition, phm[4] | | | | | | |
| Butadiene | NONE | NONE | 6 | 11.5 | 6 | 11.5 |
| SFS | NONE | 0.15 | 0.15 | 0.15 | 0.15 | 0.15 |
| DIP | NONE | 0.1 | 0.1 | 0.1 | 0.1 | 0.1 |
| Second addition, phm | | | | | | |
| Butadiene | NONE | NONE | 6 | 12 | 10.5 | NONE |
| SFS | NONE | 0.15 | 0.15 | 0.15 | — | — |
| DIP | NONE | 0.1 | 0.1 | 0.1 | 0 | 0 |
| Residual Acrylonitrile, mg/kg (ppm) | 16,300 | 16,600 | 10 | 6 | 8 | 10 |

[4] phm - Parts per hundred of polymer

We claim:

1. A method for reducing the acrylonitrile content of aqueous dispersions of copolymers of butadiene-1,3 and acrylonitrile comprising adding to said dispersion after the butadiene-1,3 and acrylonitrile have copolymerized to greater than 90% conversion to copolymer an amount of butadiene-1,3 greater than the amount of free acrylonitrile and a catalyst comprising an organic peroxide and a reducing heavy metal compound in amount based on the peroxy compound of at least about 0.1 part based on the total monomer and polymer present.

2. A method of claim 1 wherein said butadiene is added in amounts greater than a 67 to 33 weight percent ratio of butadiene to acrylonitrile, said butadiene and catalyst addition being added after the conversion of the originally charged butadiene and acrylonitrile is greater than about 93% polymer.

3. A method of claim 1 wherein said butadiene and said redox catalyst are added when the copolymers have copolymerized to a conversion to polymer of greater than 93%.

4. A method of claim 3 wherein the temperature of addition of butadiene and redox catalyst is between about 25° to 60° C. and the amount of residual free acrylonitrile resulting is less than 100 ppm.

5. A method of claim 3 wherein the amount of butadiene and acrylonitrile initially copolymerized is from about 60 to 80 weight percent butadiene-1,3 and about 20 to 40 weight percent acrylonitrile.

* * * * *